United States Patent
Guy

(10) Patent No.: US 9,022,393 B2
(45) Date of Patent: May 5, 2015

(54) CUTTING TOOL LOCK NUT HAVING GROOVED COLLET-LOCKING SURFACE AND CUTTING TOOL INCORPORATING SAME

(75) Inventor: Hanoch Guy, Petach Tikva (IL)

(73) Assignee: Iscar, Ltd., Tefen (IL)

(*) Notice: Subject to any disclaimer, the term of this patent is extended or adjusted under 35 U.S.C. 154(b) by 399 days.

(21) Appl. No.: 13/593,001

(22) Filed: Aug. 23, 2012

(65) Prior Publication Data

US 2014/0054866 A1 Feb. 27, 2014

(51) Int. Cl.
 *B23B 31/20* (2006.01)
 *B23B 31/02* (2006.01)

(52) U.S. Cl.
 CPC ......... *B23B 31/02* (2013.01); *Y10T 279/17504* (2015.01); *B23B 31/20* (2013.01); *Y10T 279/17299* (2015.01); *Y10T 279/17384* (2015.01); *Y10T 279/17111* (2015.01); *Y10T 279/17478* (2015.01); *B23B 2231/24* (2013.01); *B23B 2250/12* (2013.01); *B23B 2260/106* (2013.01); *B23B 31/201* (2013.01)

(58) Field of Classification Search
 CPC B23B 31/20; B23B 2231/24; B23B 2250/12; B23B 2260/106
 USPC ............... 279/20, 42, 43.9, 46.9, 48
 See application file for complete search history.

(56) References Cited

U.S. PATENT DOCUMENTS 4,570,952 A * 2/1986 Heimbigner et al. ........... 279/20
4,705,439 A  11/1987 Hoyle et al.
5,358,360 A  10/1994 Mai
5,378,091 A * 1/1995 Nakamura .................... 409/132
5,405,220 A * 4/1995 Ishikawa ........................ 408/56
5,975,817 A  11/1999 Komine
6,601,857 B1 * 8/2003 Richmond ...................... 279/20
6,729,627 B2 * 5/2004 Komine et al. ................ 279/157
6,746,023 B2  6/2004 Komine
7,306,238 B2  12/2007 Oshnock et al.
8,562,001 B2 * 10/2013 Taguchi .......................... 279/42
2001/0022118 A1  9/2001 Zollmann (Continued)

FOREIGN PATENT DOCUMENTS

EP 1 640 091 8/2005
EP 1 872 888 1/2008

(Continued)

OTHER PUBLICATIONS

International Search Report dated Jan. 7, 2014 issued in PCT counterpart application (No. PCT/IL2013/050628).

*Primary Examiner* — Eric A Gates

(74) *Attorney, Agent, or Firm* — Womble Carlyle

(57) ABSTRACT

A cutting tool includes a chuck, a compressible conical collet and a lock nut for locking the collet. The cutting tool lock nut has a nut portion with a threaded portion for threading with the chuck, and a locking portion with a collet-locking surface formed with angled coolant grooves thereon. The collet-locking surface presses on the collet head, thereby compressing it to grip a tool shank in a collet bore thereof. As the locking portion presses only against a peripheral surface of the collet head, the lock nut is suitable for locking collets with different bore diameters. When the chuck is provided with a coolant fluid, the coolant fluid flows through the chuck and through the collet towards the locking portion, passing through the coolant notches between the locking portion and the collet head, and sprayed towards a location along the tool shank.

21 Claims, 3 Drawing Sheets

(56) References Cited

U.S. PATENT DOCUMENTS

| | | | |
|---|---|---|---|
| 2005/0169718 A1* | 8/2005 | Beckington | 408/61 |
| 2007/0231094 A1* | 10/2007 | Guy | 408/239 R |
| 2009/0322042 A1 | 12/2009 | Kitamura | |
| 2010/0148455 A1 | 6/2010 | Taguchi | |
| 2011/0248456 A1* | 10/2011 | Guy | 279/43.9 |

FOREIGN PATENT DOCUMENTS

| | | |
|---|---|---|
| GB | 551720 | 3/1943 |
| GB | 2 401 335 | 11/2004 |
| JP | H08 112731 | 5/1996 |
| JP | 2004148429 | 5/2004 |
| JP | 2011-16203 | 1/2011 |

\* cited by examiner

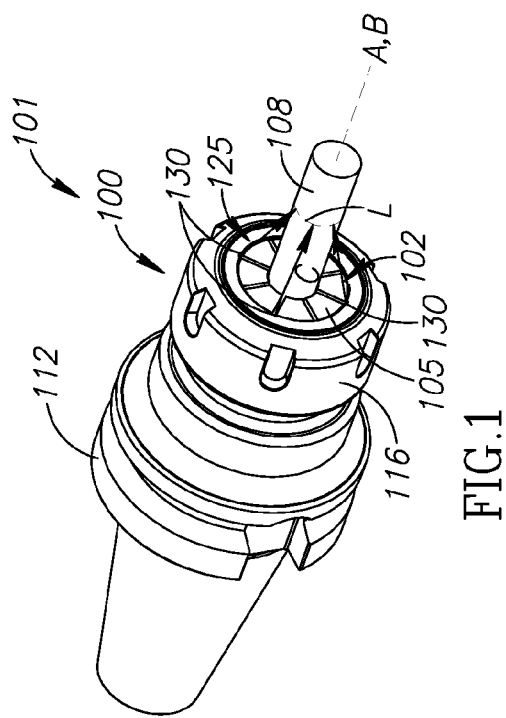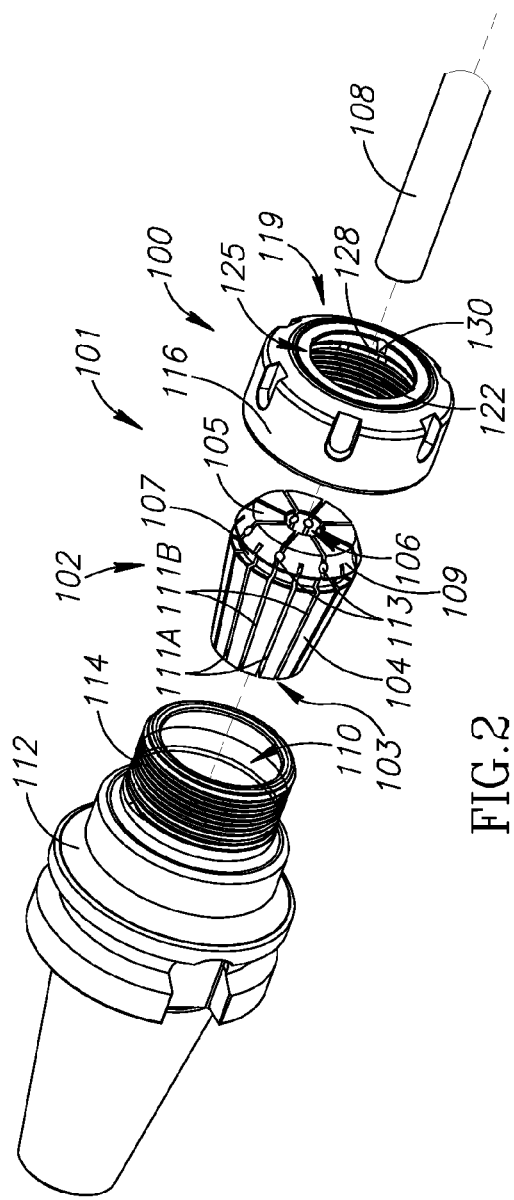
FIG.1
FIG.2

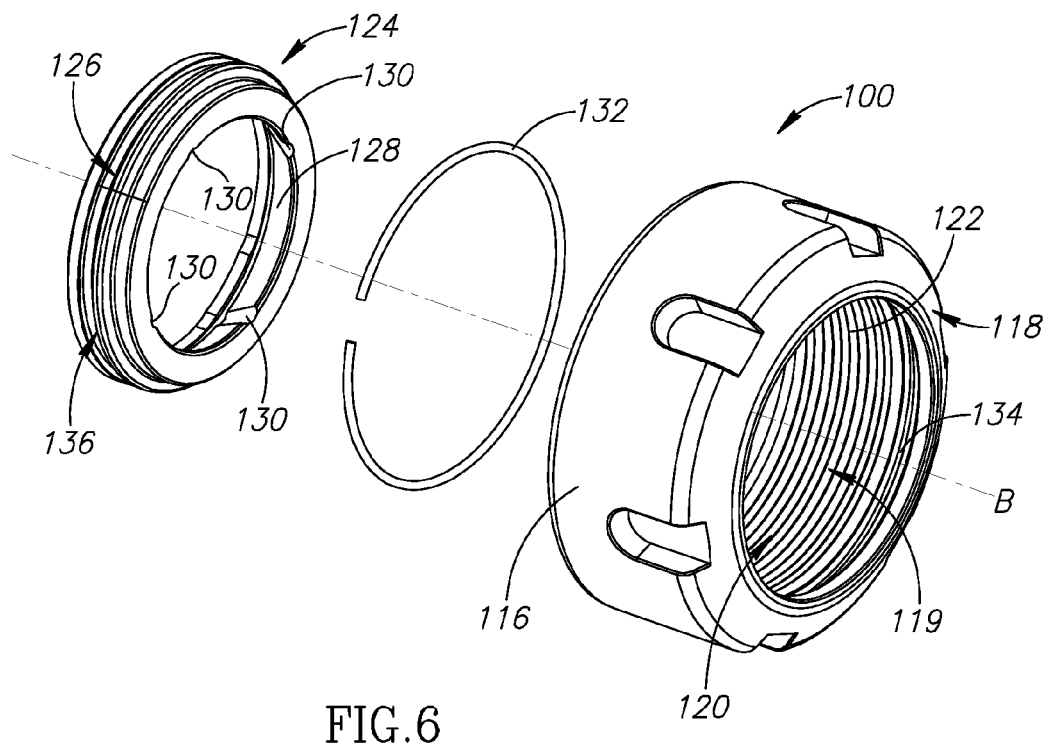
FIG.6
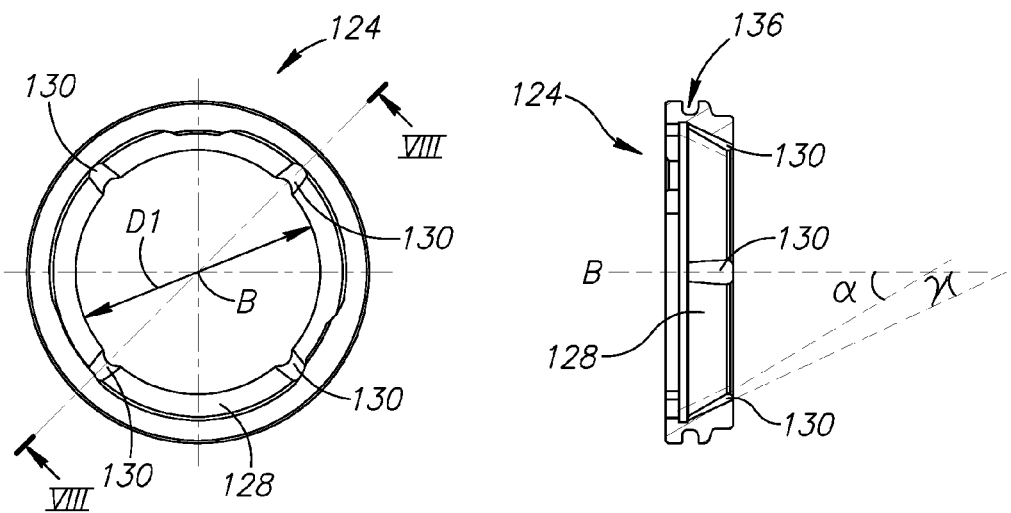
FIG.7
FIG.8

CUTTING TOOL LOCK NUT HAVING GROOVED COLLET-LOCKING SURFACE AND CUTTING TOOL INCORPORATING SAME

FIELD OF THE INVENTION

The present invention relates to a cutting tool having a compressible collet for holding a tool shank, in general, and to a lock nut for locking cutting tool collets, in particular.

BACKGROUND OF THE INVENTION

Metal cutting tools have a collet for firmly retaining a tool shank within a collet bore having a bore diameter. The collet is compressible, and a lock nut is employed to apply a compressing force thereon, thereby forcing the collet to grip the tool shank. The collets and lock nuts may allow passage of coolant fluid towards the tool shank, in order to cool down the tool shank or the area of metal being machined by the tool shank. Examples of such cutting tools and lock nuts are disclosed in EP1640091, EP1872888, GB551720, GB2401335, JP2004148429, JP2011016203, U.S. Pat. No. 5,358,360, U.S. Pat. No. 6,746,023, U.S. Pat. No. 6,729,627, U.S. Pat. No. 7,306,238, US2005/0169718, US2009/322042 and US2010/0148455.

It is an object of the present invention to provide an improved lock nut for locking a collet in a cutting tool, while allowing coolant fluid passage between the lock nut and the collet, while the lock nut is suitable for locking collets with different bore diameters.

SUMMARY OF THE INVENTION

In accordance with the present invention, there is provided a cutting tool lock nut, for locking a compressible collet, the collet having a conical collet body, a collet head and a cylindrical collet bore with a bore diameter for receiving a tool shank, the collet bore opening out to the collet head and defining a longitudinal collet central axis, the collet head having a collet head peripheral surface, the collet being fitted into a conical bore of a chuck provided with an external chuck threaded portion, the lock nut defining a lock nut central axis, and comprising:
    a nut portion having a lock nut front end provided with a lock nut front opening, and a cylindrical inner surface provided with a lock nut threaded portion; and
    a locking portion located in the nut portion adjacent the lock nut front end, the locking portion having a collet-locking surface,
    wherein:
    when the nut portion is placed over the collet head, the collet central axis and the lock nut central axis coincide, the lock nut threaded portion engages the chuck threaded portion until the locking portion presses on the collet head peripheral surface, thereby compressing the collet towards the collet central axis to grip the tool shank in the collet bore, and the lock nut being suitable for locking collets with different bore diameters, and
    the locking portion has at least one coolant groove opening out to the collet-locking surface and to the lock nut front opening, and when the chuck is provided with a coolant fluid, the coolant fluid flows through the chuck and through the collet towards the locking portion, passing through the at least one coolant groove between the locking portion and the collet head.

In accordance with another aspect of the present invention, there is provided a cutting tool, comprising:
    a cylindrical chuck having a conical bore and an external chuck threaded portion extending along the periphery of the chuck;
    a compressible collet having a conical collet body, a collet head and a cylindrical collet bore with a bore diameter for receiving a tool shank, the collet bore opening out to the collet head and defining a longitudinal collet central axis; and
    a lock nut defining a lock nut central axis and comprising:
        a nut portion having a lock nut front end provided with a lock nut front opening, and an cylindrical inner surface extending about the lock nut central axis and provided with a lock nut threaded portion; and
        an inner locking portion located within the nut portion adjacent the lock nut front end, the inner locking portion having a collet-locking surface,
    wherein:
    the collet is fitted into the conical bore of the chuck,
    the nut portion is located over the collet head, and the lock nut threaded portion engages the chuck threaded portion, until the locking portion presses on the collet head peripheral surface, thereby compressing the collet towards the collet central axis to grip the tool shank in the collet bore, and the lock nut being suitable for locking collets with different bore diameters, and
    the locking portion has at least one coolant groove opening out to the collet-locking surface and the lock nut front opening, and when the chuck is provided with a coolant fluid, the coolant fluid flows through the chuck and through the collet towards the locking portion, passing through the at least one coolant groove between the locking portion and the collet head.

In accordance with yet another aspect of the present invention, there is provided a cutting tool lock nut having a lock nut central axis and comprising:
    a nut portion having a lock nut front end provided with a lock nut front opening, and a cylindrical inner surface provided with a lock nut threaded portion, the lock nut front opening having a lock nut front opening diameter; and
    a locking portion located in the nut portion adjacent the lock nut front end, the locking portion having a collet-locking surface tapered at a first non-zero taper angle relative to lock nut central axis;
    wherein:
    the locking portion has at least one recessed coolant groove recessed in the tapered collet-locking surface and opening out to the lock nut front opening; and
    the at least one coolant groove is configured to convey a cooling fluid in a direction of the lock nut axis.

BRIEF DESCRIPTION OF THE DRAWINGS

For a better understanding, the invention will now be described, by way of example only, with reference to the accompanying drawings, in which:

FIG. 1 is a perspective view of a cutting tool in accordance with an embodiment of the present invention;

FIG. 2 is an exploded perspective view of the cutting tool of FIG. 1;

FIG. 6 is an exploded perspective view of the lock nut of the cutting tool of FIG. 1, in accordance with another embodiment of the present invention;

FIG. 7 is a rear view of the locking ring of the lock nut of FIG. 6; and

FIG. 8 is a cross section view of the locking ring of FIG. 7, according to the cutting line VIII-VIII, marked in FIG. 7.

Figure 3:
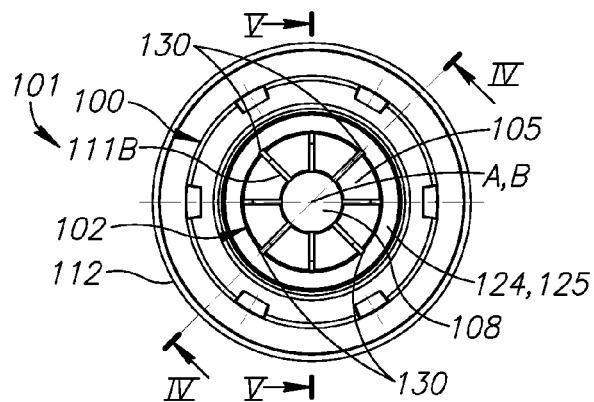
FIG. 3 is a front view of the cutting tool of FIG. 1.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

The present invention relates to a lock nut for locking a compressible conical collet in a cutting tool, the collet having a tool shank in a collet bore thereof. The lock nut has an inner locking portion provided with at least one coolant groove formed at the inner surface thereof, for allowing passage of coolant fluid there through. The coolant fluid passes through the coolant grooves, spraying towards the tool shank, thereby cooling the tool shank and the area of metal being machined by the tool shank. The lock nut locking portion presses on the outer periphery of the cutting tool collet, thus enabling the same lock nut to be suitable for locking different collets with various bore diameters.

Reference is now made to FIGS. 1-5, depicting various views of a cutting tool 101 provided with the lock nut 100 according to an embodiment of the present invention. The cutting tool 101 includes a chuck 112, a lock nut 100, a compressible collet 102 and a tool shank 108. The chuck 112 has a conical bore 110 and an external chuck threaded portion 114 extending along the periphery of the chuck 112.

With particular reference to FIG. 2, the collet 102 has a collet rear end 103, a conical collet body 104, a collet head 105, and a cylindrical collet bore 106 with a bore diameter D. Further, a narrowed collet neck portion 107 extends circumferentially between the collet head 105 and the conical collet body 104. The collet 102 also has a plurality of alternating first and second slots 111A, 111B. The first slots 111A open out to the collet rear end 103 of the collet 102, and extend along the conical collet body 104, terminating at the collet head 105. The second slots 111B open out to the collet head 105, and extend through the collet neck portion 107, terminating along the conical collet body 104. The second slots 111B are sealed at the collet head peripheral surface 109, for example, by respective sealers 113. The collet bore 106 extends along a longitudinal collet central axis A, and provides a space for receiving the tool shank 108. The collet bore 106 opens out to the collet head 105. The first and second slots 111A, 111B provide flexibility to the collet 102, enabling the collet 102 to evenly compress towards the collet central axis A, when an external compressing force is applied thereon.

The collet head 105 has a collet head peripheral surface 109, tapering at a first conic taper angle $\alpha$ relative to the collet central axis A, tapering away from the collet body 104. In particular, the first conic taper angle $\alpha$ may be a 30° angle. The collet body 104 tapers at a second conic taper angle $\beta$ relative to the collet central axis A, tapering away from the collet head 105. The second conic taper angle $\beta$ is an acute angle, and in particular, the second conic taper angle $\beta$ may be an 8° angle. The conical bore 110 of the chuck 112 is formed to receive the conical collet body 104, and the collet body 104 is fitted into the conical bore 110.

The lock nut 100 includes a nut portion 116 and a locking portion 125. The lock nut 100 defines a lock nut central axis B. The nut portion 116 has a lock nut front end 118 provided with a lock nut front opening 119, and a cylindrical inner surface 120. The cylindrical inner surface 120 extends about the lock nut central axis B, and is provided with a lock nut threaded portion 122.

The locking portion 125 may be formed in unitary one-piece construction with the nut portion 116 of the lock nut 100. Alternatively, with further reference to FIGS. 6-8, the locking portion 125 may be in the form of a locking ring 124 captured within the nut portion 116 of the lock nut 100. The locking ring 124 has a ring outer surface 126 and a collet-locking surface 128. The collet-locking surface 128 conforms to the shape of the collet head peripheral surface 109. As the collet head peripheral surface 109 has a conically tapering shape, the collet-locking surface 128 is similarly tapered by the first taper angle $\alpha$ relative to the lock nut central axis B. It should be noted that the terms "locking portion" and "locking ring" are used interchangeably herein, and both refer to the same feature which, upon fastening, presses on the collet head peripheral surface 109, as elaborated herein.

The inner locking portion 125 (i.e., locking ring 124) is located within the nut portion 116 adjacent the lock nut front end 118. The collet-locking surface 128 of the locking portion 125 is provided with at least one angled coolant groove 130 opening out to the lock nut front opening 119. The cutting tool 101 may be employed with a coolant fluid C for cooling the area of machined metal. The at least one angled coolant groove 130 may be recessed in the collet-locking surface 128 and open out to the lock nut front opening 119. When the collet-locking surface 128 engages the collet head peripheral surface 109, the coolant groove 130 is covered by the latter, thus forming a coolant channel 131 for conveying the coolant fluid C which is then ejected at an angle relative to the lock nut central axis B. In the embodiment depicted in the figures, the locking ring 124 includes four coolant grooves 130. The angled coolant grooves 130 are formed at a groove angle $\gamma$ relative to the lock nut central axis B. The groove angle $\gamma$ is an acute angle, typically in the range of 10°-45° (i.e., $10° \leq \gamma \leq 45°$). In particular, the groove angle $\gamma$ may be a 25° angle. Preferably, the angled coolant grooves 130 are arranged symmetrically about the lock nut central axis B. In the embodiment depicted in the figures, all of the angled coolant grooves 130 have a similar groove angle $\gamma$. Alternatively, each one of the angled coolant grooves 130 may be formed at a different groove angle $\gamma$.

The locking ring 124 includes a ring circumferential groove 136 on the ring outer surface 126, formed to receive a spring fastener 132 (i.e., a flexible circular string) therein. The nut portion 116 of the lock nut 100 includes a nut circumferential groove 134, also formed to receive the spring fastener 132. The locking ring 124 is pressed into the nut portion 116, with the spring fastener 132 fitted between the ring and nut circumferential grooves 136, 134. The spring fastener 132 is confined between the ring and nut circumferential grooves 136, 134 and thus prevents the locking ring 124 from falling out of the nut portion 116. As such, the locking ring 124 is captured in the nut portion 116. The locking ring 124 may still be free to rotate about the spring fastener relative to the nut portion 116, without falling out therefrom, i.e., until the lock nut 100 is fastened onto the chuck 112.

The cutting tool 101 is employed for firmly gripping the tool shank 108 during a metal cutting operation. After the collet body 104 is fitted into the conical bore 110, the lock nut 100 is placed over the collet head 105, and the lock nut threaded portion 122 is fastened on, and engages with the chuck threaded portion 114. As a result, the locking portion 125 (i.e., the locking ring 124) presses on the collet head 105 (i.e., through the collet head peripheral surface 109), pushing the collet 102 further against the conical bore 110, such that the collet 102 is evenly compressed towards the collet central axis A. This induces the collet 102 to firmly grip the tool shank 108 in the collet bore 106. When the lock nut 100 is fastened to the chuck 112 over the collet 102, the collet central axis A substantially coincides with the lock nut central axis B.

The lock nut front opening 119 has a lock nut front opening diameter D1 (which diameter may be established by the locking ring 124) which is larger than both the bore diameter D and the diameter of the tool shank 108. By having the lock nut front opening diameter D1 greater than the bore diameter D and the diameter of the tool shank, the coolant channel 131 is better able to direct coolant fluid at one or more locations forward of the lock nut front opening 119 where it may be needed. It is noted, that the lock nut front opening diameter D1 is larger than the bore diameter D, for example, by at least 25%. Alternatively, the lock nut front opening diameter D1 may be between 2-5 times larger than the bore diameter D, or more.

The locking portion 125 presses on the collet head peripheral surface 109, such that there is no direct contact between the lock nut 100 and the tool shank 108, and thus no connection between the dimensions of the locking portion 125 and the bore diameter D. In other words, the lock nut 100 locks the collet 102 without consideration of the bore diameter D. As such, the same lock nut 100 may be employed to lock different collets 102 having various bore diameters D. This is an advantageous feature of the present invention, enabling locking of collets 102 having different bore diameters D with a single lock nut, such as lock nut 100. This alleviates the requirement for different lock nuts for different collets having various bore diameters, thereby reducing costs and minimizing the amount of tool components required.

When the lock nut 100 is fastened to the chuck 112 over the collet 102, the lock nut's tapered collet-locking surface 128 is in abutment with the collet's collet head peripheral surface 109 such that the at least one recessed coolant groove 130 is covered by a portion of collet head peripheral surface 109, thereby forming the coolant channel 131 suitable for conveying the coolant fluid C, between the lock nut's tapered collet-locking surface 128 and the collet's collet head peripheral surface 109. Each of the at least one angled coolant grooves 130 opens out to the collet neck portion 107 of the collet 102. The coolant fluid C is provided into the chuck 112, and induced towards the collet 102 (e.g., by pressurizing). The coolant fluid C advances towards the rear end 103 of the collet 102, and flows through the first slots 111A, towards the collet neck portion 107. Then, the coolant fluid C flows circumferentially along the collet neck portion 107, and passes into the angled coolant grooves 130. Since the second slots 111B are sealed at the collet head peripheral surface 109, and the first slots 111A terminate at the collet head peripheral surface 109, the coolant fluid C only flows into the coolant grooves 130. The coolant fluid C is then sprayed out of the cutting tool 101 between the locking portion 125 and the collet head 105. Thereby, the coolant fluid C flows from the chuck 112 towards the locking portion 125 and out of the lock nut 100.

Figures 4, 5:
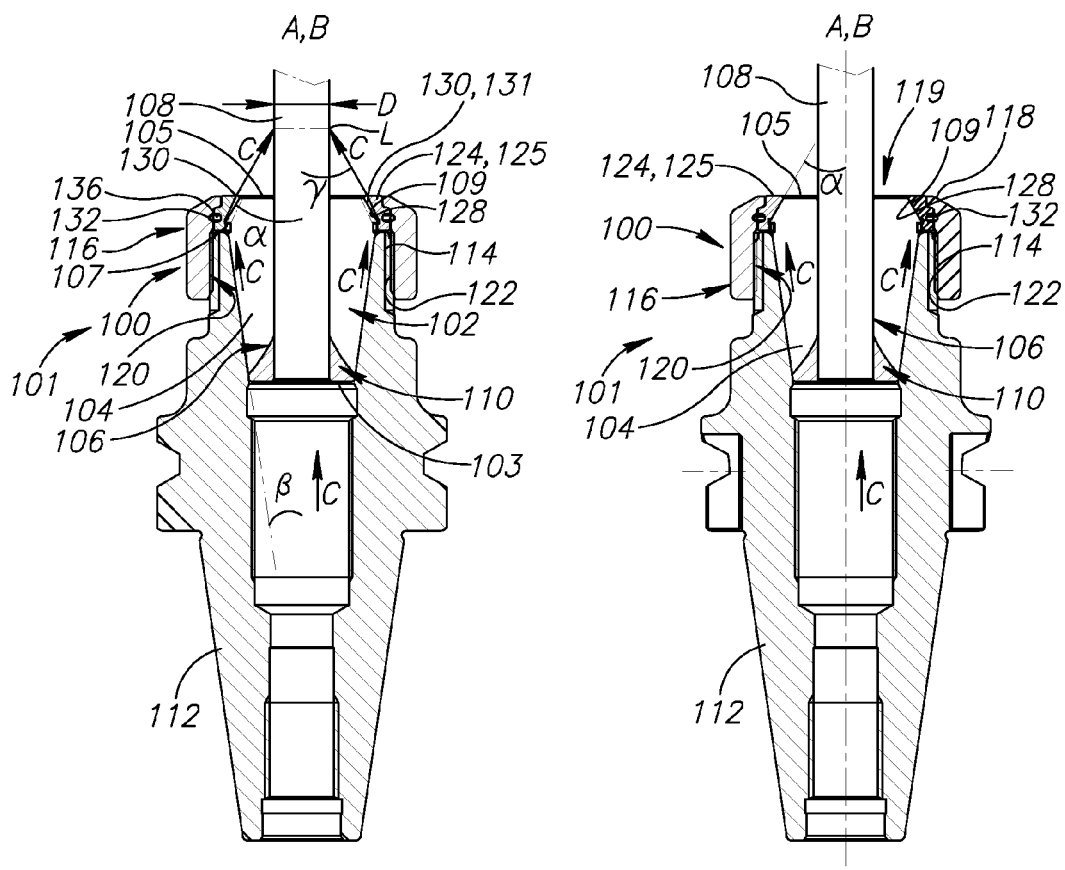
FIG. 4 is a cross section view of the cutting tool of FIG. 1, according to the cutting line IV-IV, marked in FIG. 3.
FIG. 5 is a cross section view of the cutting tool of FIG. 1, according to the cutting line V-V, marked in FIG. 3.

Indicated in FIGS. 1 and 4, the groove angle γ allows the coolant fluid C to be sprayed out through the angled coolant grooves 130, while the coolant fluid C is aimed at a shank location L along the tool shank 108. The groove angle γ determines the shank location L, along the tool shank 108, and thus may be formed according to the desired shank location L. The shank location L may be anywhere along the tool shank 108, for example, the shank location L may be at the tip of the tool shank 108. Alternatively, the shank location L may be a location between the collet head 105 and the tip of the tool shank 108, as shown in the Figures. In a case where each angled coolant groove 130 has a different groove angle γ, the coolant fluid C which is sprayed out of each angled coolant groove 130, would reach a different shank location L along the tool shank 108. It should be noted, that the tool shank 108 may be provided with a metal cutting portion (for example, at the tip of the tool shank 108), for performing metal cutting operations, such as drilling, turning and the like.

The locking ring 124 seals the collet 104 from passage of the coolant fluid C, except for through the angled coolant grooves 130. Thus, the coolant fluid C is sprayed out of the locking ring 124 solely through the angled coolant grooves 130. The cross section of FIG. 5 passes through a sealed portion of the locking ring 124 (i.e., it does not pass through the angled coolant grooves 130), showing that no coolant fluid C flows towards the tool shank 108, in this cross section.

The angled coolant grooves 130 are formed in, and open out to the collet-locking surface 128. Thus, when the lock nut 100 is unscrewed from the chuck 112 and removed from the collet head 105, the angled coolant grooves 130 are open and accessible. If any material is caught within the angled coolant grooves 130, it may easily be cleared from the angled grooves 130. For example, metal chips removed from the work piece, or coolant fluid C or other debris may be jammed in the angled coolant grooves 130, thereby blocking the angled coolant grooves 130 and preventing from further coolant fluid C to pass there through. Such blockage may be easily and rapidly cleared out, or even fall off, when the lock nut 100 is removed from the collet head 105. This is a further advantageous feature of the present invention, enabling easy and rapid cleaning of the angled coolant grooves 130.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool lock nut (100), for locking a compressible collet (102), the collet (102) having a conical collet body (104), a collet head (105) and a cylindrical collet bore (106) with a bore diameter (D) for receiving a tool shank (108), the collet bore (106) opening out to the collet head (105) and defining a longitudinal collet central axis (A), the collet head (105) having a collet head peripheral surface (109), the collet (102) being fitted into a conical bore (110) of a chuck (112) provided with an external chuck threaded portion (114), the lock nut (100) defining a lock nut central axis (B), and comprising:

a nut portion (116) having a lock nut front end (118) provided with a lock nut front opening (119), and a cylindrical inner surface (120) provided with a lock nut threaded portion (122); and a locking portion (125) located in the nut portion (116) adjacent the lock nut front end (118), the locking portion (125) having a collet-locking surface (128), wherein:

when the nut portion (116) is placed over the collet head (105), the collet central axis (A) and the lock nut central axis (B) coincide, the lock nut threaded portion (122) engages the chuck threaded portion (114) until the locking portion (125) presses on the collet head peripheral surface (109), thereby compressing the collet (102) towards the collet central axis (A) to grip the tool shank (108) in the collet bore (106), the lock nut (100) being suitable for locking collets (102) with different bore diameters (D), and the locking portion (125) has at least one angled coolant groove (130) recessed in collet-locking surface (128) and opening out to both the collet-locking surface (128) and to the lock nut front opening (119), and when the chuck (112) is provided with a coolant fluid (C), the coolant fluid (C) flows through the chuck (112) and through the collet (102) towards the locking portion (125), passing through the at least one coolant groove (130) between the locking portion (125) and the collet head (105).

2. The cutting tool lock nut (100) of claim 1, wherein the locking portion (125) is in the form of a locking ring (124) firmly captured within the nut portion (116) adjacent the lock nut front end (118), the locking ring (124) having a ring outer surface (126) and the collet-locking surface (128).

3. The cutting tool lock nut (100) of claim 1, wherein the locking portion (125) is formed in unitary one-piece construction with the nut portion (116).

4. The cutting tool lock nut (100) of claim 3, wherein the collet head peripheral surface (109) and the collet-locking surface (128) are conically tapered by a first taper angle (α) relative to the collet central axis (A) and the lock nut central axis (B), respectively.

5. The cutting tool lock nut (100) of claim 4, wherein the first taper angle (α) is a 30° angle.

6. The cutting tool lock nut (100) of claim 1, wherein the collet-locking surface (128) conforms to the shape of the collet head peripheral surface (109).

7. The cutting tool lock nut (100) of claim 1, wherein the at least one coolant groove (130) is formed at a groove angle (γ) relative to the lock nut central axis (B).

8. The cutting tool lock nut (100) of claim 7, wherein the groove angle (γ) is a 25° angle.

9. The cutting tool lock nut (100) of claim 1, comprising a plurality of coolant grooves (130) symmetrically arranged about the lock nut central axis (B).

10. The cutting tool lock nut (100) of claim 1, comprising four coolant grooves (130).

11. A cutting tool (101), comprising:
a cylindrical chuck (112) having a conical bore (110) and an external chuck threaded portion (114) extending along the periphery of the chuck (112);
a compressible collet (102) having a conical collet body (104), a collet head (105) and a cylindrical collet bore (106) with a bore diameter (D) for receiving a tool shank (108), the collet bore (106) opening out to the collet head (105) and defining a longitudinal collet central axis (A); and
a lock nut (100) defining a lock nut central axis (B) and comprising:
a nut portion (116) having a lock nut front end (118) provided with a lock nut front opening (119), and an cylindrical inner surface (120) extending about the lock nut central axis (B) and provided with a lock nut threaded portion (122); and
an inner locking portion (125) located within the nut portion (116) adjacent the lock nut front end (118), the inner locking portion (125) having a collet-locking surface (128),
wherein:
the collet (102) is fitted into the conical bore (110) of the chuck (112),
the nut portion (116) is located over the collet head (105), and the lock nut threaded portion (122) engages the chuck threaded portion (114), until the locking portion (125) presses on the collet head peripheral surface (109), thereby compressing the collet (102) towards the collet central axis (A), to grip the tool shank (108) in the collet bore (106), and the lock nut (100) being suitable for locking collets (102) with different bore diameters (D), and the locking portion (125) has at least one angled coolant groove (130) recessed in collet-locking surface (128) and opening out to both the collet-locking surface (128) and the lock nut front opening (119), and when the chuck (112) is provided with a coolant fluid (C), the coolant fluid (C) flows through the chuck (112) and through the collet (102) towards the locking portion (125), passing through the at least one coolant groove (130) between the locking portion (125) and the collet head (105).

12. A cutting tool lock nut (100) having a lock nut central axis (B) and comprising:
a nut portion (116) having a lock nut front end (118) provided with a lock nut front opening (119), and a cylindrical inner surface (120) provided with a lock nut threaded portion (122), the lock nut front opening (119) having a lock nut front opening diameter (D1); and
a locking portion (125) located in the nut portion (116) adjacent the lock nut front end (118), the locking portion (125) having a collet-locking surface (128) tapered at a first non-zero taper angle (α) relative to lock nut central axis (B);
wherein:
the locking portion (125) has at least one recessed coolant groove (130) recessed in the tapered collet-locking surface (128) and opening out to both the collet-locking surface (128) and the lock nut front opening (119); and
the at least one coolant groove (13) is configured to convey a cooling fluid (C) in a direction of the lock nut axis (B).

13. The cutting tool lock nut (100) of claim 12, wherein the locking portion (125) is in the form of a locking ring (124) firmly captured within the nut portion (116) adjacent the lock nut front end (118), the locking ring (124) having a ring outer surface (126) and the collet-locking surface (128).

14. The cutting tool lock nut (100) of claim 12, wherein the locking portion (125) is formed in unitary one-piece construction with the nut portion (116).

15. The cutting tool lock nut (100) of claim 12, wherein the at least one recessed coolant groove (130) is formed at a groove angle (γ) relative to the lock nut central axis (B).

16. The cutting tool lock nut (100) of claim 12, wherein the groove angle (γ) is a 25° angle.

17. The cutting tool lock nut (100) of claim 12, comprising a plurality of recessed coolant grooves (130) symmetrically recessed in the tapered collet-locking surface (128), about the lock nut central axis (B).

18. The cutting tool lock nut (100) of claim 17, comprising four recessed coolant grooves (130).

19. In combination, the cutting tool lock nut (100) according to claim 12 and a collet (102) having a conical collet body (104), a collet head (105) and a cylindrical collet bore (106) with a bore diameter (D), the collet bore (106) opening out to the collet head (105) and defining a longitudinal collet central axis (A), the collet head (105) having a collet head peripheral surface (109), wherein:
the lock nut's tapered collet-locking surface (128) is in abutment with the collet's collet head peripheral surface (109) such that the at least one recessed coolant groove (130) formed in the lock nut's tapered collet-locking surface (128) is covered by a portion of the collet head peripheral surface (109), thereby forming a coolant channel (131) suitable for conveying a coolant fluid, between the lock nut's tapered collet-locking surface (128) and the collet's collet head peripheral surface (109).

20. A cutting tool (101) comprising:
a cylindrical chuck (112) having a conical bore (110) and an external chuck threaded portion (114) extending along the periphery of the chuck (112);
a collet (102) having a conical collet body (104), a collet head (105) and a cylindrical collet bore (106) with a bore diameter (D), the collet bore (106) opening out to the collet head (105) and defining a longitudinal collet central axis (A), the collet head (105) having a collet head peripheral surface (109), and
the cutting tool lock nut (100) according to claim 12; wherein:
the lock nut's tapered collet-locking surface (128) is in abutment with the collet's collet head peripheral surface (109) such that the at least one recessed coolant groove (130) formed in the lock nut's tapered collet-locking surface (128) is covered by a portion of the collet head peripheral surface (109), thereby forming a coolant channel (131) suitable for conveying a coolant fluid, between the lock nut's tapered collet-locking surface (128) and the collet's collet head peripheral surface (109); and
the lock nut's lock nut threaded portion (122) is engaged to the chuck's external chuck threaded portion (114).

21. The cutting tool (101) according to claim 20, further comprising a tool shank (108) retained in the collet bore (106) of the collet (102).

\* \* \* \* \*